June 17, 1952     F. E. TUTTLE ET AL     2,600,816
GRID-TYPE DISPLAY SIGN

Filed Sept. 20, 1950     2 SHEETS—SHEET 1

Fordyce E. Tuttle
Otto Wittel
Inventors

Daniel I. Mayne

Attorneys

June 17, 1952  F. E. TUTTLE ET AL  2,600,816
GRID-TYPE DISPLAY SIGN
Filed Sept. 20, 1950  2 SHEETS—SHEET 2
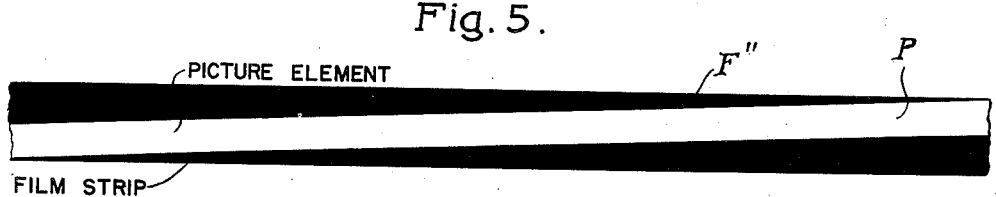
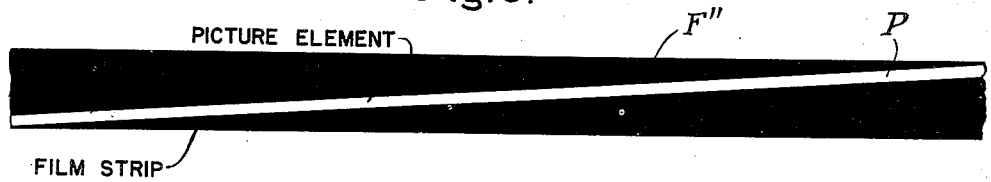
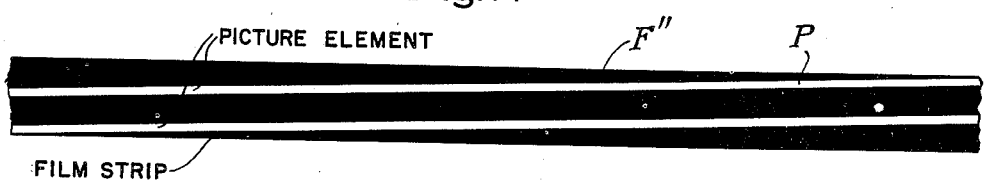
Fordyce E. Tuttle
Otto Wittel
Inventors
Attorneys Patented June 17, 1952

2,600,816

UNITED STATES PATENT OFFICE 2,600,816

GRID-TYPE DISPLAY SIGN

Fordyce E. Tuttle and Otto Wittel, Rochester, N. Y., assignors to Eastman Kodak Company, Rochester, N. Y., a corporation of New Jersey Application September 20, 1950, Serial No. 185,714

10 Claims. (Cl. 40—133.1)

The present invention relates to advertising display signs, and particularly to an improved sign of this type which is a transparency adaptable to large-size reproduction and to displaying subject matter of a changeable nature, either as a series of still pictures, or as a motion sequence.

There have been two major difficulties with nearly all forms of composite or grid-type display signs which have been proposed by prior art. These are finite length of display available, and the confusing effects due to both longitudinal and transverse film shrinkage resulting from the processing thereof. The difficulty caused by film shrinkage is due to the fact that all of the picture elements which are intended to be viewed simultaneously to make up the composite picture do not properly align with all the grid slots in the viewer over the entire picture area, and as the result of which all, or certain parts, of the picture may be lost, or be incoherent. This shrinkage difficulty was generally overcome by cementing the film to glass, but this procedure puts a limit on the size of display which can be made.

Copending patent application Serial No. 174,394, filed July 18, 1950, in the name of one of the present inventors, proposes the use of a plurality of narrow strips of film, 16 or 35 mm., threaded in channels in front of elongated light tubes in making grid-type displays of this type; each film strip constituting a transparency representative of an elongated elemental part of the complete display. This type of display made it possible to make large displays and cut down the shrinkage difficulties in one dimension, that transverse to the grid pattern, by the use of plurality of narrow strips of film rather than a single sheet of film. Shrinkage of the films lengthwise was of no import, since there was no grid pattern breaking up the film strips in this dimension; each film strip having a single picture element running its full length. Accordingly, this form of display was not readily adapted to reproducing a display of changing pictures or reproducing a motion sequence. Therefore, so far as the present invention concerns a grid-type display using a plurality of narrow strips of photographic film arranged in side-by-side relation in a viewing plane, rather than a single sheet of film, it may be considered an improvement or modification of the display sign shown in the above-noted copending application.

Among the objects of the present invention is to provide a display sign of the grid or composite type which is adaptable to displaying areas of large dimension; which is adaptable to displaying changeable subject matter, either in the form of successive still pictures or successive "frames" of a motion sequence; in which film shrinkage difficulties are reduced to a minimum; and which is capable of displaying a show of either finite or infinite length.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a partial front elevational view of a display sign constructed in accordance with a preferred embodiment of the present invention;

Figure 4:
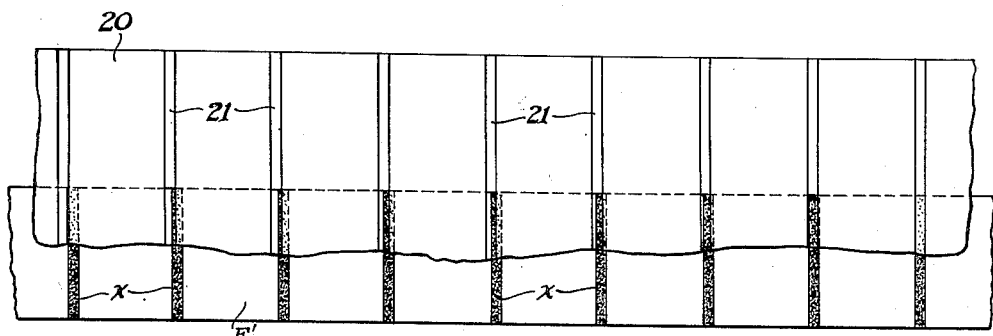
Fig. 4 is a diagrammatic view illustrating how film shrinkage might serve to produce an incoherent or incomplete display if vertical picture elements and a vertical grid were used to obtain the changeable effect in the display.

Figs. 5–7 diagrammatically illustrate three different ways in which the picture elements can be applied to the individual film strips making up the complete display, and illustrate how the ratio of slit width to picture element width determines the film travel necessary for a complete picture change.

Like reference characters refer to corresponding parts throughout the drawings.

It has been adequately shown by recent development work on grid-type pictures that it is not necessary that a complete picture be present in order that the subject appear continuous and with adequate definition. In other words, composite pictures, or pictures made up of elongated elements extending across one dimension of the picture, and which may or may not be separated from one another by an opaque area, are perfectly satisfactory to an observer when viewed by transmitted light from a distance greater than some minimum which can be determined mathematically for the case where the picture elements are separated.

This invention proposes making a large display sign in the form of a transparency, preferably color, by making a photographic enlargement through a multiple line grid onto a light-sensitive surface comprising a plurality of elongated narrow strips of color film arranged in side-by-side parallel relation in a common exposure plane. This results in the desired picture being broken up into elongated narrow picture elements exposed on the different film strips, and which elements, after the films are processed to transparencies, are rearranged in their original order and viewed by transmitted light through the grid through which the exposure was made, combine to present an enlarged composite picture of the original subject. By using the plurality of narrow film strips for recording the picture, instead of a single sheet of film, several advantages are obtained. One advantage is that the film strips, which may be conventional motion-picture film, or strips of that width, can be processed with standard processing equipment in a rapid manner and can be thereafter readily threaded into proper assembled relation. Another advantage is that film shrinkage difficulties are, or can be, greatly reduced, as the result of which the grid principle of displaying pictures can be used to make changeable displays of great, or even infinite, length.

Figure 2:
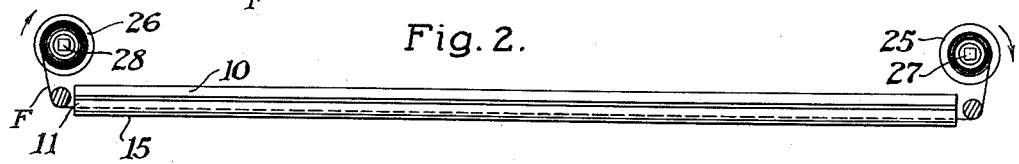
Fig. 2 is a top plan view of the display sign shown in Fig. 1.
Figure 1:
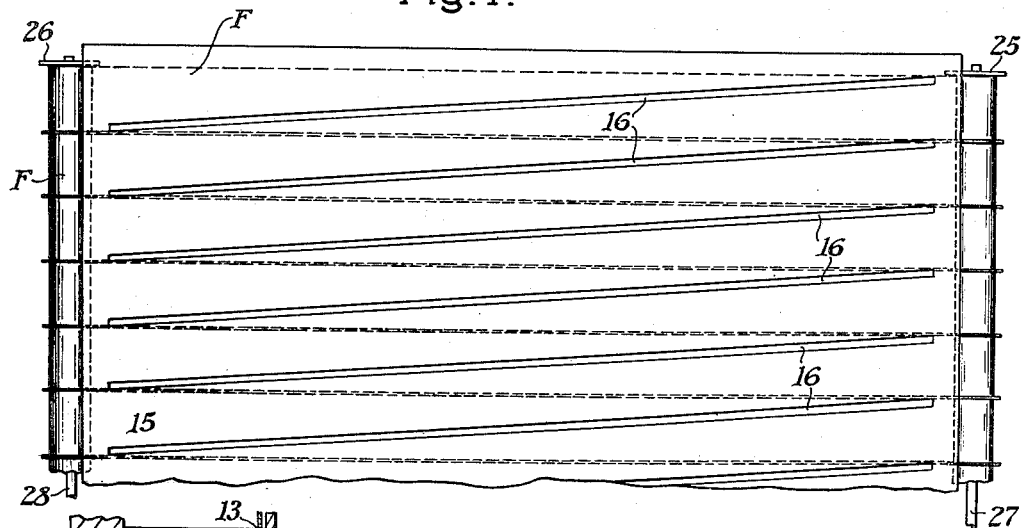
Figure 3:
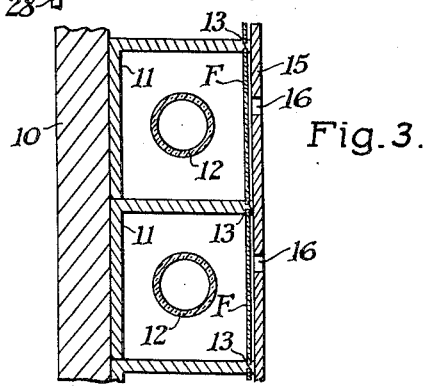
Fig. 3 is an enlarged vertical sectional view through the sign of Fig. 1 and showing only two adjacent film strips thereof.

Referring now to the drawings, and particularly Figs. 1–3, a changeable display sign constructed in accordance with a preferred embodiment of the present invention is shown as comprising a plurality of elongated narrow exposed and processed film strips "F," which may be unperforated 16 or 35 mm. motion-picture film. These film strips, therefore, constitute transparencies having narrow elongated picture elements extending transversely thereof in parallel juxtaposition, the individual picture elements on each strip constituting an elemental part of different composite pictures, while corresponding picture elements on the several films form an elemental part of the same composite or grid-type picture. Accordingly, if the film strips are moved simultaneously and synchronously in front of a grid like that through which they were originally exposed, or the strips are held still and the grid is moved relative thereto, a changeable picture will appear on the display sign when viewed by transmitted light.

For display purposes, the film strips "F" must be mounted in side-by-side relation substantially in a common plane and be uniformly illuminated from the rear. To this end, the sign includes a vertically disposed support 10 on the front of which are mounted L-shaped partitions 11 relatively disposed so as to form U-shaped channels, in each of which an elongated light tube 12 is disposed. The forwardly extending arms of each of the partitions include grooves 13 extending lengthwise thereof and into which opposite edges of the film strips "F" extend so as to be capable of being fed lengthwise to change the picture, see Fig. 3. Light tubes 12 may be conventional fluorescent tubes, or other type of gaseous discharge tube, having a frosted surface, and the interior of the channels should also be painted white to give a uniform and somewhat diffuse light source.

The film strip supports, and film strips "F" supported thereby, are covered by a stationary grid 15 having at least one slot 16 for each film strip "F." As will be readily understood by those skilled in the art, this grid is identical with the one through which the film strips were originally exposed, so that the individual picture elements on the strips "F" can be brought into alignment with the slots in the grid, and all of the picture elements on the several strips can be viewed simultaneously by transmitted light so as to present a composite picture to an observer. In order to make the display sign changeable, the picture elements are placed on the individual film strips in a direction transversely thereof. Then, if the film strips and grid are moved relative to one another in a direction lengthwise of the film strips, then as successive picture elements on the strips are moved into alignment with the grid slots 16, a new picture will be presented on the face of the sign.

While, theoretically, these picture elements on the film strips and the slots of the grid could extend in a direction normal to the length of the film strips, we have found that for practical reasons this is very unsatisfactory because of film shrinkage due to processing. This difficulty has been illustrated in Fig. 4 wherein reference character 20 designates a grid having vertical slots 21 behind which an elongated film strip F' might have been originally exposed. After processing, the film strip has shrunk in a longitudinal direction to such an extent that the picture elements designated "x" exposed thereon through the grid no longer will line up with all of the slots in the grid; hence, the picture would be incomplete and/or incoherent upon playback.

We have found that this shrinkage difficulty can be overcome if the slots 16 in the grid, and, hence, the picture elements on the film strips, extend across the film strips at an angle to the length thereof, rather than in a direction normal to the strips, as clearly shown in Fig. 1. It can be readily appreciated by comparing Fig. 1 to Fig. 4 that the shrinkage tolerance is increased many times by the use of sloping grid slots 16 by virtue of the fact that the shrinkage takes place along some diagonal of a slot rather than across its width, as in the vertical case illustrated in Fig. 4. As the angle of slope of the grid slots is decreased, the shrinkage tolerance is increased. Accordingly, by this approach, the effect of film shrinkage has been reduced in two ways. Using a plurality of individual narrow film strips, rather than a single sheet of film, reduces the transverse shrinkage factor, and the use of sloping scanning slots 16 increases the tolerance for longitudinal shrinkage by a factor equal to the ratio of the slit width to the slit disposal.

The width of the grid slots 16 and, hence, the width of the picture elements on the film strips can vary, depending upon the character of the picture to be displayed. Looking at Figs. 5–7, which diagrammatically illustrate film strips having a single picture element thereon, the picture elements "P" may be fairly wide, as shown in Fig. 5, or they may be narrow as shown in Fig. 6. Likewise, as indicated in Fig. 7, a single film strip may have two narrow picture elements "P" forming a part of the same picture so that the strip would have to be covered by two grid slots 16. This might be desirable in pictures requiring a maximum degree of definition in order to bring out certain details therein. These figures also illustrate how the ratio of picture element width to film strip width determines the film travel necessary for a complete change of pictures in that if these film strips were to display changeable subject matter, then they would each have a plurality of these picture elements in juxtaposed parallel relation along the strip and the strips would have to be moved the diagonal width of one picture element measured lengthwise of the film strip in order to change the display.

If one wishes a long display of different pictures, it is obvious that the slope of the grid slots 16, and, consequently, the slope of the individual picture elements "P" on the individual film strips, can be no greater than that given when a sloping slot spans one film strip in its length across the sign, as shown in each of the illustrated embodiments. Under these conditions, each individual film can have a plurality of juxtaposed picture elements "P," successive ones of which constitute elemental parts of different pictures, so that if all of the strips are moved in synchronism behind the grid, successive picture elements will be moved into alignment with the slots in the grid to present a changing display. This condition is met in the arrangement requiring two grid slots over a single strip of film, as shown in Fig. 7, by making the degree of slope such that the lower left-hand end of the upper picture element "P" and the upper right-hand end of the lower picture element "P" do not overlap one another when considered in a direction longitudinally of the film strip.

As will be understood by those skilled in the art, these displays will be made by arranging unexposed film strips behind the grid 15, in the manner illustrated, and successively exposing the same to different pictures through the slotted grid by simultaneously and synchronously indexing the strips behind the slots between each exposure. After the film strips are processed, they are rearranged behind the grid in the same way in which they were exposed and are viewed through the slotted grid by transmitted light. By advancing the film strips synchronously behind the grid, the different picture elements thereon are successively brought into alignment with the grid slots for playing back the different pictures in succession. If long displays are desired, long film strips may be used and can be stored in supply rolls 25 from which they are fed across the grid 15 to take-up rolls 26, as shown in Fig. 1. If the supply rolls of film are mounted in driving relation on a common spindle 27, having a suitable hold-back mechanism, not shown, and the take-up rolls 26 are mounted in driving relation with a common spindle 28, then the films can be readily fed across the grid 15 simultaneously and in synchronism by rotating the spindle 28 in the manner necessary to successively present the different pictures on the films.

It will also be appreciated that a changeable display of the nature of a motion picture can be obtained with this sign if the successive picture elements exposed on the film strips through the grid 15 are "frames" of a motion sequence and the film strips are advanced past the grid in such a manner as to display the "frames" to convey the motion sequence. A changeable display of infinite length could be readily obtained by making the film strips endless and repeatedly feeding them back across the grid, rather than feeding them from a supply to a take-up roll and rewinding for another showing.

A sign of this type is not limited to the use of long film strips and the showing of long or infinite displays, but can, just as readily and sometimes with advantage, be used to present displays of a short finite length. In such instances, each film strip would be traversed by a plurality of grid slots having a steeper slope than that shown in Fig. 1, or even vertical, as shown in Fig. 4, if films not showing appreciable film shrinkage were available. In this case, the number of different pictures which could be displayed would be limited to the number of different picture elements which could be placed on the film strip between two adjacent grid slots, as is well known in conventional grid procedures. For instance, if the grids were ⅛" wide and spaced from one another on 1½" centers, then twelve different pictures could be placed on the film strips before a repitition of picture would occur. The primary advantage of the present invention, namely correction of difficulties due to longitudinal shrinkage of the film strips, would be available in such an embodiment for the reason that it would permit the use of grid slots having anywhere from a 30° to 90° slope relative to the length of the film strips. Inasmuch as the grid slots are sloping, the cross grid motion for certain movable sequences reproduced thereon might be considerable and annoying, depending upon whether the sequence possessed considerable motion in this direction. Thus, for some moving subjects it might be necessary to increase the degree of slope of the grid slots and even expose the film strips intermittently to the subject in order to alleviate this undesirable cross motion effect. Playback of such an intermittently exposed motion picture could readily be obtained by driving the take-up spindle 28 with a suitable Geneva mechanism, not shown, and flashing the tubular light sources in timed relation with the film strip advance in order to obtain the effect obtained by a shutter in a conventional motion-picture projector; namely, to cut out the light during the time film strips are being advanced and turning them on during the intervals the film strips are stationary.

From the above description it will be apparent that the present invention makes possible a grid-type display sign which can be conveniently made in extremely large sizes, i. e., outdoor billboard size, and on which changeable displays of a finite or an infinite length can be obtained. These changeable displays can either be in the nature of different still pictures, or in the nature of a motion sequence. By the use of sloping grid slots, and the use of individual narrow strips of film, film shrinkage difficulties in both dimensions of the sign are reduced to a minimum.

Although we have shown and described certain specific embodiments of our invention, we are fully aware that many modifications thereof are possible. Our invention, therefore, is not to be limited to the specific details of construction shown and described by way of illustration, but is intended to cover all modifications coming within the scope of the appended claims.

Having thus described our invention, what we claim as new and desire to secure by Letters Patent of the United States is:

1. A changeable grid-type display sign comprising a plurality of narrow, elongated transparencies mounted in side-by-side parallel relation substantially in a common plane so as to be viewed by transmitted light, each transparency bearing a like number of narrow, elongated picture elements extending transversely thereof and disposed in parallel juxtaposition along the length thereof, correspondingly spaced picture elements on each transparency constituting a part of the same complete picture while successive correspondingly spaced elements on each transparency constitutes a part of different complete pictures, a grid disposed in front of said transparencies in a plane substantially parallel thereto, and provided with slits complementary in size and shape to the picture elements on said transparencies and being of such number and disposition as to simultaneously align with the different correspondingly spaced picture elements on all of said transparencies forming a part of the same complete picture, and means for moving said transparencies and grid relative to one another whereby correspondingly spaced picture elements on the several transparencies can be simultaneously viewed in succession by transmitted light to see the complete composite pictures formed thereby.

2. A grid-type display sign comprising a plurality of narrow, elongated transparencies mounted in side-by-side parallel relation substantially in a common plane so as to be viewed by transmitted light, each transparency bearing a narrow, elongated picture element constituting a part of the same complete picture so that when a plurality of said picture elements on different transparencies are viewed simultaneously by transmitted light they combine to form a complete composite type picture; said picture elements being a fraction as wide as the transparencies and extending along said transparencies at an angle to the length thereof; a grid disposed in front of said transparencies in a plane substantially parallel thereto, said grid provided with as many slits as there are transparencies and which slits are complementary in width and length to the picture elements on said transparencies, and said slits disposed so that each one thereof lies in front of a different one of said transparencies and has the same angular relation to the transparencies as the picture elements thereon.

3. A grid-type display sign according to claim 2, characterized by the fact that each transparency bears a plurality of narrow, elongated picture elements in spaced parallel relation and each constituting a part of the same complete picture, and said grid is provided with as many slits as there are picture elements on all of said transparencies, said slits being of such size and so disposed that they can all be aligned with all of the picture elements at the same time.

4. A changeable grid-type display sign comprising a plurality of narrow, elongated transparencies mounted in side-by-side parallel relation substantially in a common plane so as to be viewed by transmitted light, each transparency bearing a plurality of narrow, elongated picture elements, each being a fraction as wide as the transparency and disposed in parallel relation along said transparency at an angle to the length thereof, corresponding picture elements on the several transparencies constituting a part of the same complete picture while successive corresponding elements on each transparency constitutes a part of different complete pictures; a grid disposed in front of said transparencies in a plane substantially parallel thereto, said grid provided with as many slits as there are transparencies and which slits are complementary in width and length to the picture elements on said transparencies and disposed so that each one thereof lies in front of a different one of said transparencies and has the same angular relation to the transparencies as the picture elements thereon, and means for simultaneously moving said transparencies and grids relative to one another in synchronism whereby corresponding picture elements on the several transparencies can be successively simultaneously viewed by transmitted light to see the complete composite picture formed thereby.

5. A changeable grid-type display sign according to claim 4 in which the successive corresponding picture elements on the several transparencies form parts of different still pictures, and means for simultaneously and synchronously indexing said transparencies relative to said grid to present the different still pictures in succession.

6. A changeable grid-type display sign according to claim 4 and characterized by the fact that the grid is stationary, each transparency comprises a web whose length is in excess of the width of the grid, the successive corresponding picture elements of the transparencies constituting parts of different "frames," of a motion sequence, and means for feeding said transparencies in synchronism across said grid in such a manner as to play back the motion sequence recorded thereon.

7. A changeable grid-type display sign according to claim 4 and characterized by the fact that the grid is stationary, each transparency comprises a web whose length is in excess of the width of the grid, the successive corresponding picture elements of the transparencies constituting parts of different "frames" of a motion sequence recorded thereon by moving the transparencies continuously relative to slits during exposure, and means for continuously feeding said transparencies in synchronism across said grid to play back the motion sequence recorded thereon.

8. A film strip for use in a changeable grid-type display sign of the type described comprising an elongated, narrow strip of photographic film exposed and processed to a transparency including an elongated, narrow picture element extending transversely of said film which constitutes an elemental part of a complete composite picture to be displayed on said sign.

9. A film strip for use in a changeable grid-type display sign of the type described comprising an elongated, narrow strip of photographic film exposed and processed to a transparency, including an elongated, narrow picture element extending transversely of said film at an angle to the length thereof and which constitutes an elemental part of a complete composite picture to be displayed on said sign.

10. A film strip for use in a changeable grid-type display sign of the type described comprising an elongated, narrow strip of photographic film exposed and processed to a transparency, including a plurality of elongated, narrow picture elements extending transversely of said film and being disposed thereon in juxtaposed parallel relation, each successive picture element constituting an elemental part of a different composite picture to be displayed on said sign.

FORDYCE E. TUTTLE.
OTTO WITTEL.

REFERENCES CITED

The following references are of record in the file of this patent:

UNITED STATES PATENTS

| Number | Name | Date |
|---|---|---|
| 617,244 | Fougerat | Jan. 3, 1899 |
| 1,403,631 | Pyper | Jan. 17, 1922 |

FOREIGN PATENTS

| Number | Country | Date |
|---|---|---|
| 582,523 | France | Oct. 16, 1924 |
| 805,850 | France | Sept. 7, 1936 |